United States Patent
Agrawal et al.

(10) Patent No.: US 9,998,394 B2
(45) Date of Patent: Jun. 12, 2018

(54) SYSTEMS AND METHODS FOR SCALABLE NETWORK BUFFER MANAGEMENT

(71) Applicant: Veritas Technologies LLC, Mountain View, CA (US)

(72) Inventors: Mukund Agrawal, Maharashtra (IN); Sachin Dravid, Maharashtra (IN); Deepak Patil, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 118 days.

(21) Appl. No.: 14/833,590

(22) Filed: Aug. 24, 2015

(65) Prior Publication Data

US 2017/0005944 A1 Jan. 5, 2017

(30) Foreign Application Priority Data

Jul. 3, 2015 (IN) .......................... 2560/MUM/2015

(51) Int. Cl.
| | |
|---|---|
| *G06F 15/173* | (2006.01) |
| *H04L 12/925* | (2013.01) |
| *H04L 12/26* | (2006.01) |
| *H04L 29/08* | (2006.01) |
| *H04L 12/835* | (2013.01) |

(52) U.S. Cl.
CPC ........ *H04L 47/722* (2013.01); *H04L 43/0876* (2013.01); *H04L 43/16* (2013.01); *H04L 67/1097* (2013.01); *H04L 47/30* (2013.01)

(58) Field of Classification Search
CPC ... H04L 47/722; H04L 43/0876; H04L 43/16; H04L 67/1097; H04L 47/30

USPC .......................................................... 709/223
See application file for complete search history.

(56) References Cited

U.S. PATENT DOCUMENTS

| | | | | |
|---|---|---|---|---|
| 6,501,733 | B1 * | 12/2002 | Falco | H04L 12/5695 370/235 |
| 6,820,129 | B1 * | 11/2004 | Courey, Jr. | H04L 47/10 709/226 |
| 8,379,515 | B1 * | 2/2013 | Mukerji | H04L 47/323 370/229 |
| 2005/0052994 | A1 | 3/2005 | Lee | |

(Continued)

OTHER PUBLICATIONS

"TCP window scale option", https://en.wikipedia.org/wiki/TCP_window_scale_option, as accessed Jun. 23, 2015, Wikipedia, (Sep. 13, 2006).

(Continued)

*Primary Examiner* — Joseph L Greene
(74) *Attorney, Agent, or Firm* — FisherBroyles LLP (57) ABSTRACT

The disclosed computer-implemented method for scalable network buffer management may include (1) receiving, via a connection to a client, data to be transmitted to a cloud service, (2) buffering the data in at least one data buffer, (3) determining that the data will not be transmitted to the cloud service within a timeout period for the client connection, (4) delaying reception of additional data from the client connection for a portion of the timeout period, and (5) before the timeout period has elapsed, buffering data from the client connection in at least one secondary data buffer, wherein the secondary data buffer is smaller in size than the data buffer. Various other methods, systems, and computer-readable media are also disclosed.

18 Claims, 5 Drawing Sheets

(56) References Cited

U.S. PATENT DOCUMENTS

| | | | |
|---|---|---|---|
| 2009/0235110 A1* | 9/2009 | Kurokawa | G06F 11/0727 714/3 |
| 2011/0239010 A1* | 9/2011 | Jain | G06F 1/3209 713/310 |
| 2012/0290166 A1* | 11/2012 | Wallace | G07C 5/085 701/29.2 |
| 2014/0089259 A1* | 3/2014 | Cheng | G06F 3/061 707/612 |
| 2014/0196044 A1* | 7/2014 | Fernando | G06F 9/5027 718/102 |
| 2014/0330888 A1 | 11/2014 | Dave | |
| 2016/0314023 A1* | 10/2016 | Shum | G06F 9/5083 |

OTHER PUBLICATIONS

"Symantec NetBackup", www.symantec.com/NetBackup, as accessed Jun. 23, 2015, Symantec Corporation, (Jul. 16, 2006).

"Amazon S3", http://aws.amazon.com/s3/, as accessed Jun. 23, 2015, Amazon Web Services, Inc., (Mar. 16, 2006).

Shread, Paul "AT&T, EMC Unveil Cloud Storage Service", http://www.enterprisestorageforum.com/ipstorage/news/article.php/3820881/ATT-EMC-Unveil-Cloud-Storage-Service.htm, as accessed Jun. 23, 2015, (May 18, 2009).

"Swift", http://www.rackspace.com/blog/tag/swift/, as accessed Jun. 23, 2015, The Rackspace Blog! & Newswroom, (Feb. 13, 2012).

"Google Cloud Platform", https://cloud.google.com/, as accessed Jun. 23, 2015, (Mar. 25, 2012).

\* cited by examiner

SYSTEMS AND METHODS FOR SCALABLE NETWORK BUFFER MANAGEMENT

BACKGROUND

Cloud data storage services have become a popular way to protect valuable data, providing off-site data storage and high levels of availability and security. Cloud storage services, however, may not provide user interface or data communication features needed or desired by end users, and particularly for organizations with large numbers of users. To fulfill these needs, backup management services have been developed to mediate between the cloud storage provider and end users. Backup management services may be managed by businesses or other organizations with many end users, by third parties, or by cloud storage providers themselves.

Some of the problems addressed by a backup management service may include latency, bandwidth, and connection management issues that result in connection timeouts on either the client or cloud service ends, frequent retries, and bandwidth underutilization. Accordingly, the instant disclosure identifies and addresses a need for additional and improved systems and methods for scalable network buffer management.

SUMMARY

As will be described in greater detail below, the instant disclosure describes various systems and methods for scalable network buffer management that manage data communication between clients and a cloud storage service by buffering data in primary and secondary data buffers, maintaining connections between the clients and the buffer management system and between the buffer management system and the cloud service, and by monitoring and controlling bandwidth utilization.

In one example, a computer-implemented method for scalable network buffer management may include (1) receiving, via a connection to a client, data to be transmitted to a cloud service, (2) buffering the data in one or more data buffers, (3) determining that the data will not be transmitted to the cloud service within a timeout period for the client connection, (4) delaying reception of additional data from the client connection for a portion of the timeout period, and (5) before the timeout period has elapsed, buffering data from the client connection in one or more secondary data buffers that are smaller in size than the data buffers.

In some examples, delaying reception of additional data from the client connection may include delaying notification of the client that the data has been received. In some examples, the computer-implemented method may further include determining that no data buffer is available to buffer the data received via the client connection. In some examples, delaying reception of additional data from the client connection may include buffering the data from the client connection in the secondary data buffer and delaying reception of additional data from the client connection for a portion of the timeout period. In one embodiment, the computer-implemented method may further include determining that the data will be transmitted to the cloud service within the timeout period for the client connection and delaying reception of additional data from the client connection until an acknowledgement has been received that the cloud service has received the data.

In one embodiment, the computer-implemented method may further include (1) receiving, via a connection to the cloud service, data to be transmitted to the client, (2) buffering the data in one or more data buffers, (3) determining that the data will not be transmitted to the client within a timeout period for the cloud service connection, (4) delaying reception of additional data from the cloud service connection for a portion of the cloud service connection timeout period, and (5) before the cloud service connection timeout period has elapsed, buffering data from the cloud service connection in one or more secondary data buffers.

In one embodiment, the computer-implemented method may further include (1) maintaining one or more additional connections to the cloud service, (2) determining that the additional data will not be received via the client connection within a timeout period for the cloud connection, and (3) transmitting at least a portion of the data to the cloud service using the additional connection to the cloud service before the timeout period for the cloud connection has elapsed. In some examples, the computer-implemented method may further include determining a number of additional connections to the cloud service to maintain based at least in part by a ratio of the timeout period for the cloud connection to a time to receive data to fill a data buffer from the client.

In one embodiment, the computer-implemented method may further include (1) determining a total bandwidth utilization of a group of connections to the cloud service, (2) determining that the bandwidth utilization is below a threshold, and (3) incrementally increasing a rate at which one or more connections transmit data to the cloud service. In one embodiment, the computer-implemented method may further include determining that the bandwidth utilization is above the threshold and delaying transmission of data on one or more connections to the cloud service for a time interval. In one embodiment, the computer-implemented method may further include reallocating one or more data buffers as one or more smaller, secondary data buffers and delaying reception of additional data from the client connection for a time interval.

In one embodiment, the computer-implemented method may further include (1) receiving a retry notification from the cloud service for a data transmission indicating that the rate of data transmission to the cloud service should be decreased, (2) determining that the number of secondary data buffers in use is above a threshold, and (3) delaying retrying the data transmission for a time interval.

In one embodiment, a system for implementing the above-described method may include several modules stored in memory, such as (1) a communication module that receives, via a connection to a client, data to be transmitted to a cloud service, (2) a buffering module that buffers the data in one or more data buffers, (3) a traffic module that determines that the data will not be transmitted to the cloud service within a timeout period for the client connection, (4) a metering module that delays reception of additional data from the client connection for a portion of the timeout period, (5) a secondary buffering module that, before the timeout period has elapsed, buffers data from the client connection in one or more secondary data buffers that are smaller in size than the data buffers. The system may also include at least one physical processor configured to execute the communication module, the buffering module, the traffic module, the metering module, and the secondary buffering module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, via a connection to a client, data to be transmitted to a cloud service, (2) buffer the data in one or more data buffers, (3) determine that the data will not be transmitted to the cloud service within a timeout period for the client connection, (4) delay reception of additional data from the client connection for a portion of the timeout period, and (5) before the timeout period has elapsed, buffer data from the client connection in one or more secondary data buffers that are smaller in size than the data buffers.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for scalable network buffer management. As will be explained in greater detail below, by managing buffers, connections, and bandwidth, the systems and methods described herein may manage data communication between many backup clients and a cloud storage service with efficient bandwidth utilization and a reduced number of connection timeouts and/or retry requests.

Figure 1:
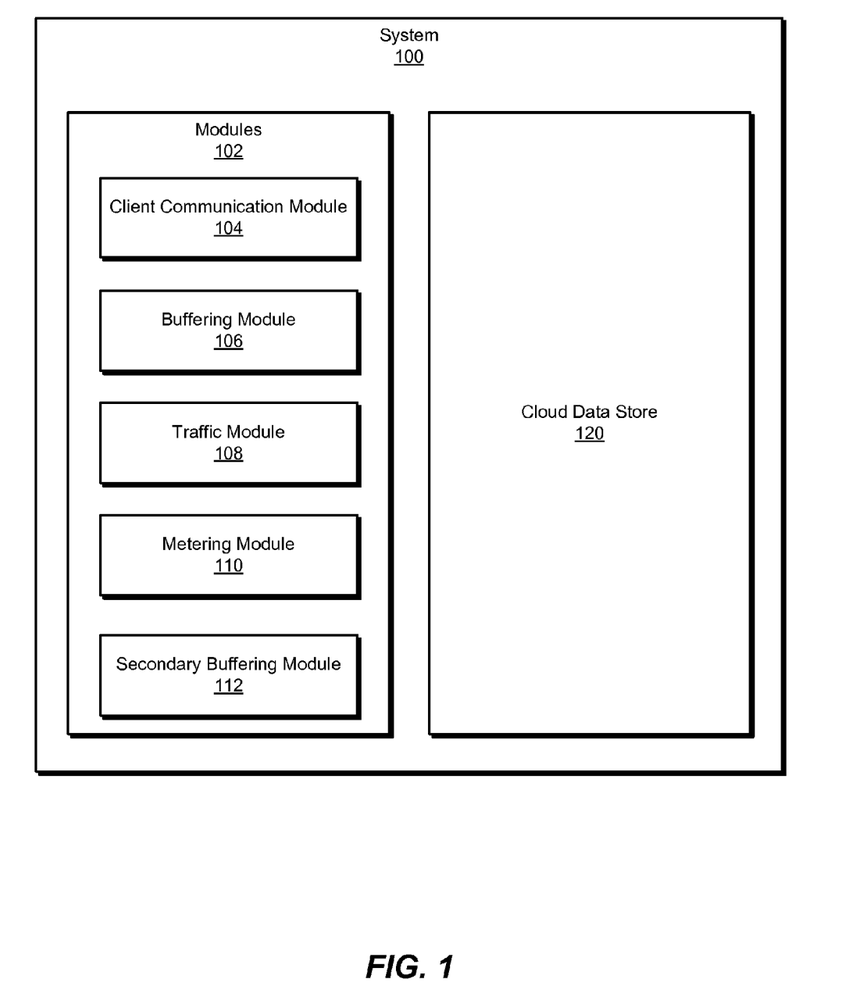
FIG. 1 is a block diagram of an exemplary system for scalable network buffer management.
Figure 2:
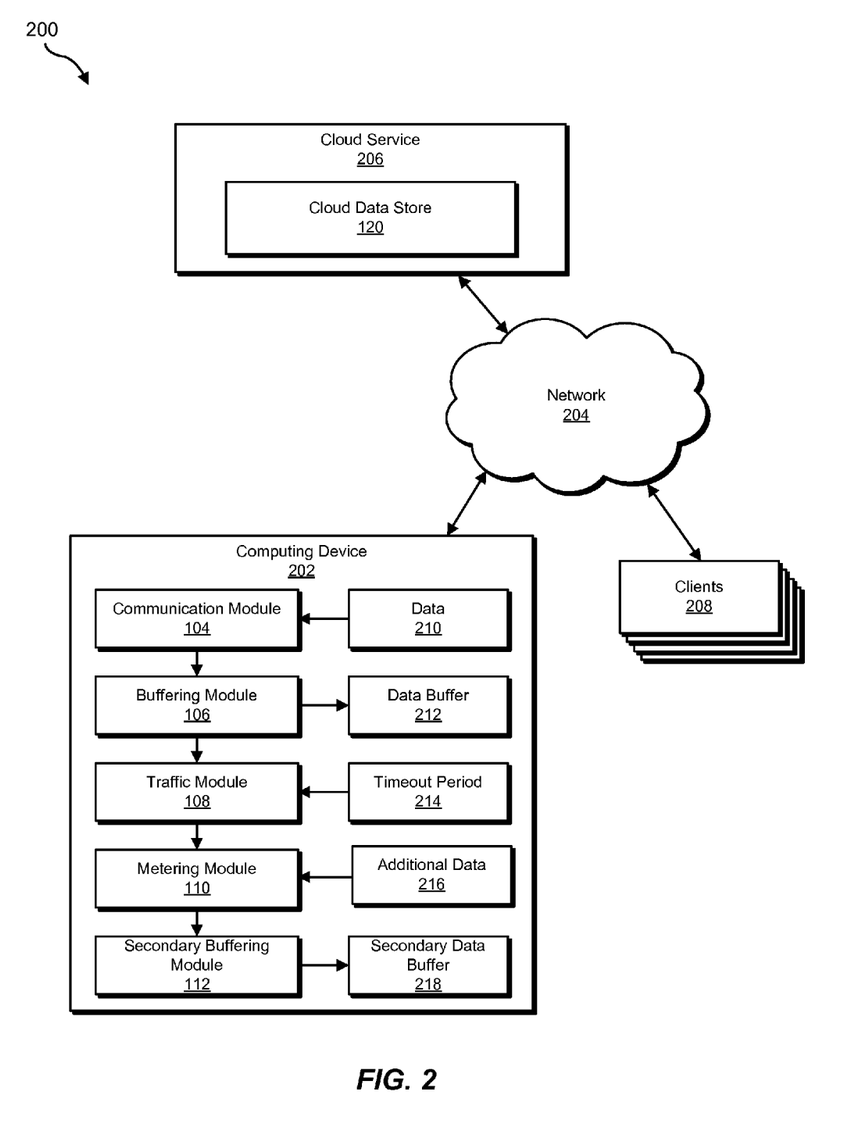
FIG. 2 is a block diagram of an additional exemplary system for scalable network buffer management.

The following will provide, with reference to FIGS. 1-2, detailed descriptions of exemplary systems for scalable network buffer management. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for scalable network buffer management. As illustrated in this figure, exemplary system 100 may include one or more modules 102 for performing one or more tasks. For example, and as will be explained in greater detail below, exemplary system 100 may include a communication module 104 that receives, via a connection to a client, data to be transmitted to a cloud service. Exemplary system 100 may additionally include a buffering module 106 that buffers the data in one or more data buffers. Exemplary system 100 may also include a traffic module 108 that determines that the data will not be transmitted to the cloud service within a timeout period for the client connection. Exemplary system 100 may additionally include a metering module 110 that delays reception of additional data from the client connection for a portion of the timeout period. Exemplary system 100 may also include a secondary buffering module 112 that, before the timeout period has elapsed, buffers data from the client connection in one or more secondary data buffers, where the secondary data buffers are smaller in size than the data buffers. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, cloud service 206, and/or client 208), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases, such as cloud data store 120. In one example, cloud data store 120 may be configured to store data from computing devices, such as desktop computers, laptop or notebook computers, tablet computers, and/or mobile devices such as smartphones.

Cloud data store 120 may represent portions of a single database or computing device or a plurality of databases or computing devices. For example, cloud data store 120 may represent a portion of computing device 202 or cloud service 206 in FIG. 2, computing system 410 in FIG. 4, and/or portions of exemplary network architecture 500 in FIG. 5. Alternatively, cloud data store 120 in FIG. 1 may represent one or more physically separate devices capable of being accessed by a computing device, such as computing device 202 or cloud service 206 in FIG. 2, computing system 410 in FIG. 4, and/or portions of exemplary network architecture 500 in FIG. 5.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with cloud service 206 via a network 204. In one example, computing device 202 may be programmed with one or more of modules 102 and/or may store all or a portion of the data in cloud data store 120. Additionally or alternatively, cloud service 206 may be programmed with one or more of modules 102 and/or may store all or a portion of the data in cloud data store 120.

In one embodiment, one or more of modules 102 from FIG. 1 may, when executed by at least one processor of computing device 202 and/or cloud service 206, enable computing device 202 and/or cloud service 206 to manage data communication between one or more clients 208 and cloud service 206. For example, and as will be described in greater detail below, communication module 104 may receive, via a connection to a client 208, data 210 to be transmitted to cloud service 206. Buffering module 106 may then buffer data 210 in at least one data buffer 212. Traffic module 108 may then determine that data 210 will not be transmitted to cloud service 206 within a timeout period 214 for the client connection. In response, metering module 110 may delay reception of additional data 216 from the client connection for a portion of timeout period 214. Secondary buffering module 112 may, before timeout period 214 has elapsed, buffer data 210 from the client connection in at least one secondary data buffer 218 that is smaller in size than data buffers 212.

Computing device 202 and clients 208 generally represent any type or form of computing device capable of reading computer-executable instructions. Examples of computing device 202 and clients 208 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 410 in FIG. 4, or any other suitable computing device.

Cloud service 206 generally represents any type or form of computing device that is capable of receiving, storing, and transmitting data. Examples of cloud service 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 500 in FIG. 5, or the like. Network 204 may facilitate communication or data transfer using wireless or wired connections. In one embodiment, network 204 may facilitate communication between computing device 202 and cloud service 206.

Figure 3:
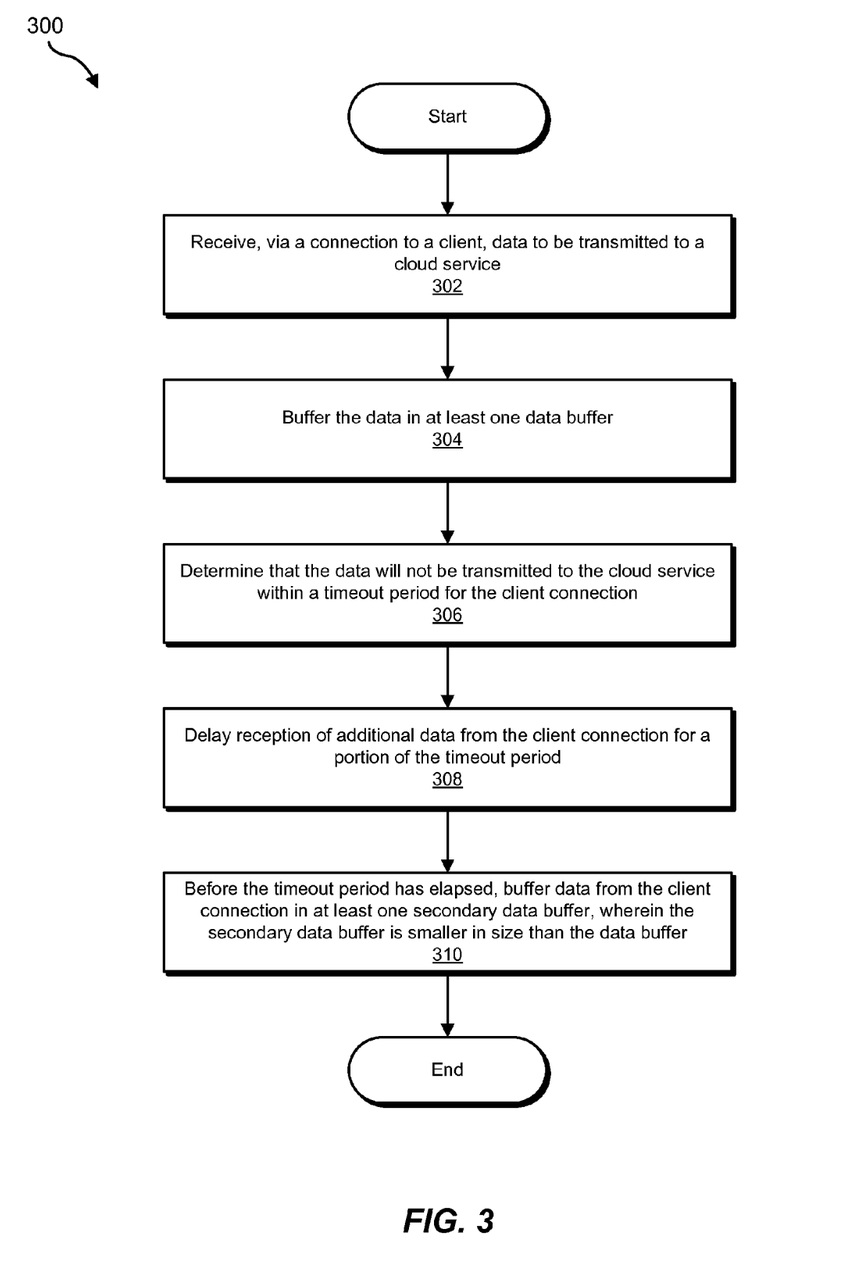
FIG. 3 is a flow diagram of an exemplary method for scalable network buffer management.

FIG. 3 is a flow diagram of an exemplary computer-implemented method 300 for scalable network buffer management. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302, one or more of the systems described herein may receive, via a connection to a client, data to be transmitted to a cloud service. For example, communication module 104 may, as part of computing device 202 in FIG. 2, receive, via a connection to client 208, data 210 to be transmitted to a cloud service.

As used herein, the terms "cloud service" or "cloud storage service" generally refer to any service, platform, and/or infrastructure that is capable of providing online and/or third-party hosting for data storage to individual or organizational clients (e.g., providing storage as a service). In some examples, a cloud computing service may provide one or more clients with a view of data without providing the client complete access to all underlying systems. For example, a cloud computing service may allow a consumer to specify service requirements and/or resource requirements without requiring and/or allowing the consumer to control the underlying hardware resources. Examples of cloud computing services may include, without limitation, AMAZON SIMPLE STORAGE SERVICE, GOOGLE CLOUD SERVICE, MICROSOFT ONEDRIVE FOR BUSINESS, and AT&T CLOUD STORAGE.

Communication module 104 may receive data from a client to be transmitted to a cloud service in a variety of ways. For example, communication module 104 may establish a transport layer security/secure sockets layer (TSL/SSL) connection to the client so that both the client and server may authenticate the other's identity and the data may be encrypted during transmission. Communication module 104 may alternatively use any suitable protocols for establishing a connection and receiving data from the client.

At step 304, one or more of the systems described herein may buffer the data in at least one data buffer. For example, buffering module 106 may, as part of computing device 202 in FIG. 2, buffer data 210 in at least one data 210 buffer. As used herein, the term "data buffer" may refer to any storage buffer, cache, and/or other data structure or mechanism for gathering and/or temporarily storing data.

Buffering module 106 may buffer the data in a variety of ways. For example, rather than allocating a single, large buffer to a client connection to synchronously transmit data from the client to the cloud service, buffering module 106 may allocate several smaller buffers to each client connection. As each buffer is filled, and as long as there are additional buffers available for the connection, buffering module 106 may return control to the client to send additional data.

At step 306, one or more of the systems described herein may determine that the data will not be transmitted to the cloud service within a timeout period for the client connection. For example, traffic module 108 may, as part of computing device 202 in FIG. 2, determine that data 210 will not be transmitted to the cloud service within a timeout period 214 for the connection to client 208.

Traffic module 108 may determine that the data will not be transmitted to the cloud service within a timeout period for the client connection in a variety of ways. For example, traffic module 108 may use the configured timeout value for the computing system as an initial value for the timeout period. If traffic module 108 observes clients dropping connections before the configured timeout period, traffic module 108 may reduce the timeout value to the timeout value used by the client. In some examples, traffic module 108 may maintain transmission time statistics to determine the likelihood that the client timeout period will expire before the data is transmitted to the cloud service. Transmission time statistics may include average transmission time, transmission time range, and transmission time standard deviation.

At step 308, one or more of the systems described herein may delay reception of additional data from the client connection for a portion of the timeout period. For example, metering module 110 may, as part of computing device 202 in FIG. 2, delay reception of additional data 216 from the connection to client 208 for a portion of timeout period 214.

Metering module 110 may delay reception of additional data from the client in a variety of ways. For example, after data has been received from the client and stored in a data buffer, metering module 110 may delay reception of additional data from the client connection by delaying notification of the client that the data has been received. In this way, data reception from the client may be slowed while data is transmitted to the cloud service, with data reception continuing before the end of the timeout period for the client. Re-establishing a connection and having the client attempt to resend apparently lost data can be very time-consuming. Metering module 110 may avert the associated impact on data throughput by controlling the rate of data reception from the client.

In one embodiment, the systems described herein may include (1) determining that the data will be transmitted to the cloud service within the timeout period for the client connection and (2) delaying reception of additional data from the client connection until an acknowledgement has been received that the cloud service has received the data. For example, as part of computing device 202 in FIG. 2, traffic module 108 may determine, even when data is expected to be transmitted to the cloud service within the client's timeout period, that the likelihood that the expected acknowledgement from the cloud service may not be received before the client's timeout period expires is above a threshold. To decrease the probability of a lost connection to the client, traffic module 108 may direct metering module 110 to delay reception of additional data so that data buffers will continue to be available for receiving data from the client, and throughput may be maintained at close to a constant rate.

At step 310, one or more of the systems described herein may buffer data from the client connection in at least one secondary data buffer that is smaller in size than the data buffer before the timeout period has elapsed. For example, secondary buffering module 112 may, as part of computing device 202 in FIG. 2, buffer data 210 from the connection to client 208 in at least one secondary data buffer 218, before timeout period 214 has elapsed, that is smaller in size than data 210 buffer.

The term "secondary data buffer," as used herein, generally refers to any storage buffer, cache, and/or other data structure or mechanism for gathering and/or temporarily storing data. Secondary data buffers may be much smaller than primary data buffers, and may be sized to be a small multiple of a client data transmission. Since secondary data buffers are kept in reserve and intended to be used only when needed to control the rate of data transmission from clients, secondary data buffers may represent only a small percentage (5-10 percent) of total buffer memory.

Secondary buffering module 112 may buffer client data in secondary buffers in a variety of ways. For example, secondary buffering module 112 may determine that no data buffer is available to buffer the data received via the client connection, buffer data from the client connection in a secondary data buffer, and delay reception of additional data from the client connection for a portion of the timeout period.

In one embodiment, secondary buffering module 112 may determine that transmission of data to the cloud service has slowed and that additional secondary data buffers may be required. Secondary buffering module 112 may then reallocate one or more data buffers as smaller secondary data buffers and delaying reception of additional data from the client connection for a time interval. By doing so, secondary buffering module 112 may continue to receive and buffer data from the client before the client's timeout period has expired.

In addition to managing data transmission from clients, the systems and methods described herein may use data buffers and additional connections to manage data transmission to the cloud service. As with clients, connections to cloud services may be dropped when data is not transmitted on the connection within a timeout period. In some examples, the systems described herein may determine that a number of additional connections to the cloud service should be maintained based at least in part by a ratio of the timeout period for the cloud connection to a time to receive data to fill a data buffer from the client.

In one embodiment, systems described herein may include (1) maintaining one or more additional connections to the cloud service, (2) determining that additional data will not be received via the client connection within a timeout period for the cloud connection, and (3) transmitting at least a portion of the data to the cloud service using the additional connection to the cloud service before the timeout period for the cloud connection has elapsed. For example, as part of computing device 202 in FIG. 2, traffic module 108 may determine that client 208 is transmitting data at a much slower rate than the rate cloud service 206 can receive it. To prevent the connection to cloud service 206 from timing out, traffic module 108 may determine that a number of additional connections to cloud service 206 should be dedicated to client 208. A portion of the data received and buffered from the client may be transmitted on each of the connections, in turn, such that the connection to the cloud service does not time out.

In one embodiment, the systems described herein may include (1) determining the total bandwidth utilization of a plurality of connections to the cloud service, (2) determining that the bandwidth utilization is below a threshold, and (3) incrementally increasing a rate at which one or more connections transmit data to the cloud service. For example, as part of computing device 202 in FIG. 2, traffic module 108 may measure bandwidth utilization for each connection to the cloud service and calculate a percentage of total bandwidth utilization for all connections. If traffic module 108 determines that bandwidth utilization is below a threshold value (such as the maximum bandwidth allocated for connections to the cloud service), traffic module 108 may signal metering module 110 to incrementally increase the data transmission rate for one or more cloud service connections. By doing so, the systems described herein may utilize as much available bandwidth as possible and avoid violating client throttling guarantees.

In one embodiment, the systems described herein may include (1) determining that the bandwidth utilization is above the threshold and (2) delaying transmission of data on one or more connections to the cloud service for a time interval. For example, as part of computing device 202 in FIG. 2, traffic module 108 may determine that total bandwidth utilization is above a threshold value and direct metering module 110 to delay data transmission on one or more connections to the cloud service. By doing so, the systems described herein may prevent denial of service for processes running on computing device 202 other than data transmissions to the cloud service. By combining incremental increases in data transmission rate with transmission delays with bandwidth utilization has reached a threshold, a percentage of available bandwidth may be reserved for connections utilizing that bandwidth, while preventing denial of service to other processes.

In one embodiment, the systems described herein may include (1) receiving, via a connection to the cloud service, data to be transmitted to the client, (2) buffering the data in at least one data buffer, (3) determining that the data will not be transmitted to the client within a timeout period for the cloud service connection, (4) delaying reception of additional data from the cloud service connection for a portion of the cloud service connection timeout period, and (5) before the cloud service connection timeout period has elapsed, buffering data from the cloud service connection in one or more secondary data buffers. For example, as part of computing device 202 in FIG. 2, (1) communication module 104 may receive, via a connection to the cloud service, data to be transmitted to the client, (2) buffering module 106 may buffer the data in at least one data buffer, (3) traffic module 108 may determine that the data will not be transmitted to the client within a timeout period for the cloud service connection, (4) metering module 110 may delay reception of additional data from the cloud service connection for a portion of the cloud service connection timeout period, and (5) secondary buffering module 112 may, before the cloud service connection timeout period has elapsed, buffer data from the cloud service connection in at least one secondary data buffer The systems described herein may restore data from the cloud service to a client using methods that, in many ways, mirror the backup process, but with some differences in the use of data buffers and secondary data buffers. When restoring data from the cloud, buffering module 106 may allocate a larger percentage of buffer memory to secondary data buffers. For example, 70-80 percent of buffer memory may be allocated for data buffers, with the remaining memory allocated for secondary data buffers. When the available data buffers have been filled, secondary buffering module 112 begins filling secondary data buffers with data received from the cloud service, with delays of 20-30 percent of the cloud timeout between data read requests to the cloud service. By doing so, the systems described herein may prevent connections to the cloud service from timing out, with a resulting loss of data throughput.

As described above, the systems and methods described herein may manage data communication between a large number of backup clients and a cloud storage service. The systems and methods described herein may optimize bandwidth utilization and provide greater overall data throughput by managing data buffers to prevent connection loss with either the backup clients or the cloud service. By managing available bandwidth as a pool of bandwidth available to all connections, the systems and methods described herein may incrementally increase bandwidth utilization while preventing denial of service to other processes running on the buffer management computing device.

Figure 4:
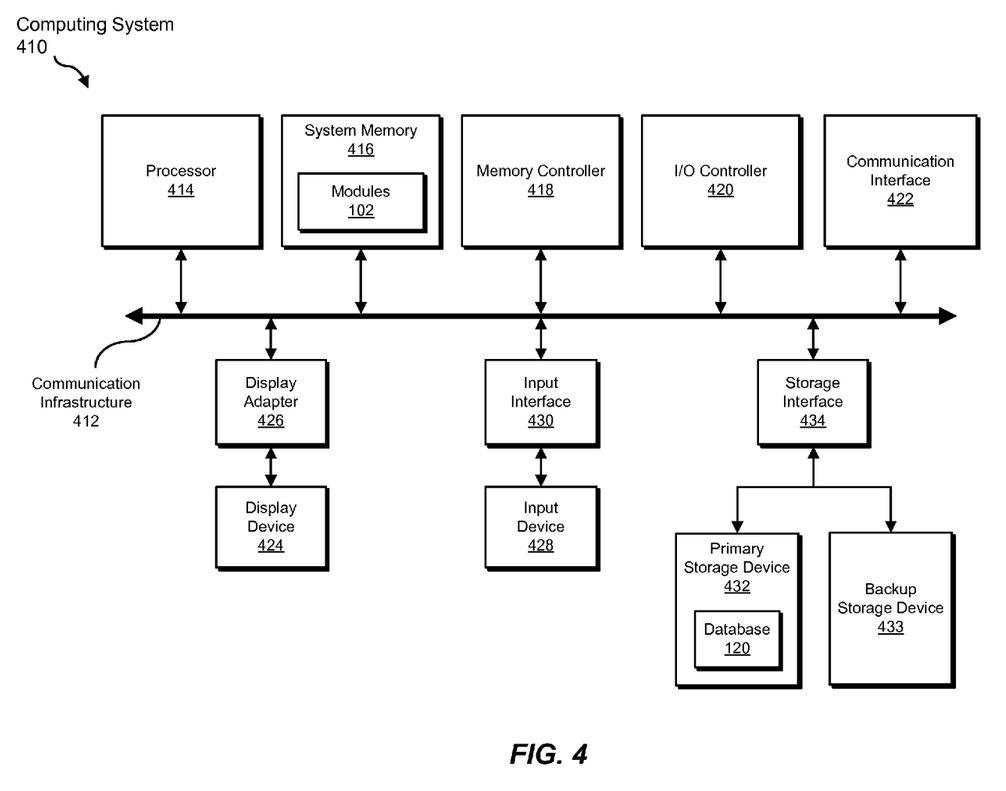
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, cloud data store 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
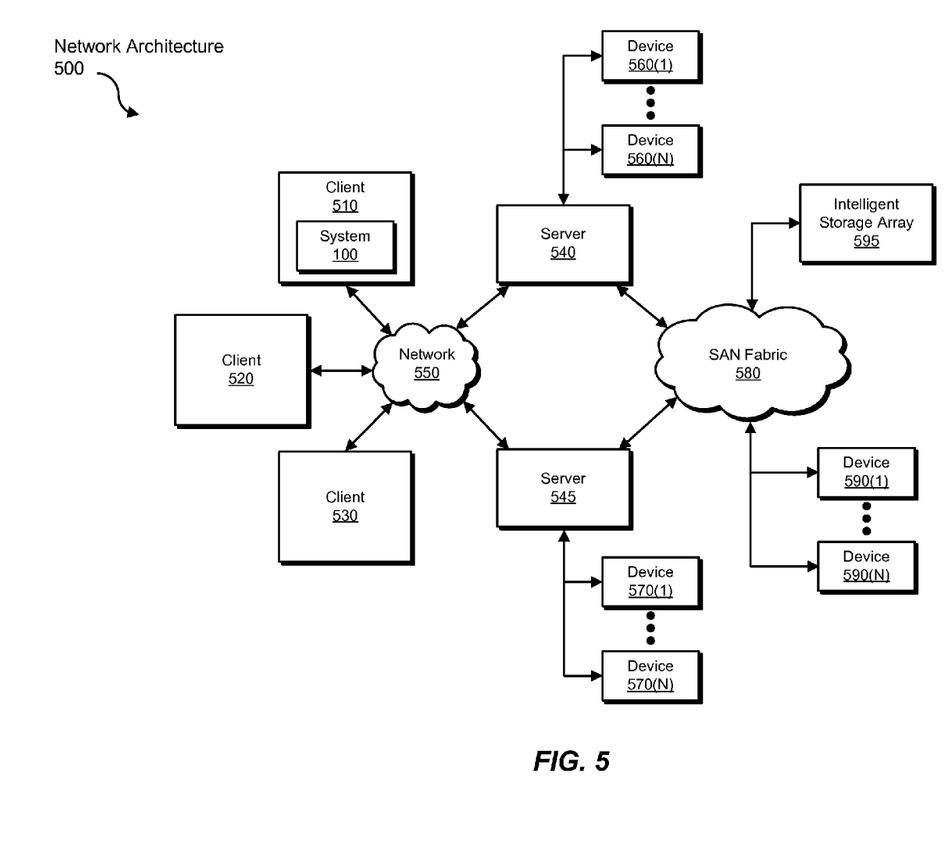
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for scalable network buffer management.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data, output a result of the transformation to transmit the data to or from a cloud storage service, use the result of the transformation to manage transmission of the data, and store the result of the transformation to manage transmission of data to or from a cloud storage service. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for scalable network buffer management, at least a portion of the method being performed by a computing device comprising at least one processor, the method comprising: receiving, via a client connection to a client, data to be transmitted to a cloud storage service as part of a backup process; buffering the data in at least one data buffer; determining that the data will not be transmitted to the cloud storage service within a timeout period for the client connection; delaying reception of additional data from the client connection for a portion of the timeout period; before the timeout period has elapsed, buffering data from the client connection in at least one secondary data buffer; maintaining an additional cloud service connection to the cloud storage service; determining that the additional data will not be received via the client connection within a cloud service connection timeout period for the cloud service connection; transmitting at least a portion of the data to the cloud storage service using the cloud service connection to the cloud storage service before the cloud service connection timeout period for the cloud service connection has elapsed, wherein: the at least one secondary data buffer is smaller in allocated memory size than the allocated memory size of the at least one data buffer; the at least one secondary data buffer amounts to 5-10 percent of total buffer memory.

2. The computer-implemented method of claim 1, wherein delaying reception of additional data from the client connection comprises delaying notification of the client that the data has been received.

3. The computer-implemented method of claim 1:
further comprising determining that no data buffer of the at least one data buffer is available to buffer the data received via the client connection;
wherein delaying reception of additional data from the client connection comprises:
buffering the data from the client connection in the at least one secondary data buffer;
delaying reception of additional data from the client connection for a portion of the timeout period.

4. The computer-implemented method of claim 1, further comprising:
determining that the data will be transmitted to the cloud storage service within the timeout period for the client connection;
delaying reception of additional data from the client connection until an acknowledgement has been received that the cloud storage service has received the data.

5. The computer-implemented method of claim 1, further comprising: receiving, via the additional cloud service connection to the cloud storage service, data to be transmitted to the client; buffering the data in at least one data buffer; determining that the data will not be transmitted to the client within a the cloud service connection timeout period for the cloud service connection; delaying reception of additional data from the cloud service connection for a portion of the cloud service connection timeout period; before the cloud service connection timeout period has elapsed, buffering data from the cloud service connection in at least one secondary data buffer.

6. The computer-implemented method of claim 1, claim 1, further comprising determining a number of additional connections to the cloud storage service to maintain based at least in part on a ratio of the timeout period for the cloud service connection to a time to receive, from the client, data to fill the data buffer.

7. The computer-implemented method of claim 1, further comprising:
determining a total bandwidth utilization of a plurality of connections to the cloud storage service;
determining that the total bandwidth utilization is below a threshold;
incrementally increasing a rate at which at least one connection transmits data to the cloud storage service.

8. The computer-implemented method of claim 7, further comprising:
determining that the total bandwidth utilization is above the threshold;
delaying transmission of data on at least one connection to the cloud storage service for a time interval.

9. The computer-implemented method of claim 8, further comprising:
reallocating at least one data buffer as at least one smaller secondary data buffer;
delaying reception of additional data from the client connection for a time interval.

10. The computer-implemented method of claim 1, further comprising:
receiving a retry notification from the cloud storage service for a data transmission indicating that a rate of data transmission to the cloud storage service should be decreased;
determining that a number of secondary data buffers in use is above a threshold;
delaying retrying the data transmission for a time interval.

11. A system for scalable network buffer management, the system comprising: a communication module, stored in memory, that receives, via a client connection to a client, data to be transmitted to a cloud storage service as part of a backup process; a buffering module, stored in memory, that buffers the data in at least one data buffer; a traffic module, stored in memory, that determines that the data will not be transmitted to the cloud storage service within a timeout period for the client connection; a metering module, stored in memory, that delays reception of additional data from the client connection for a portion of the timeout period; a secondary buffering module, stored in memory, that, before the timeout period has elapsed, buffers data from the client connection in at least one secondary data buffer; at least one physical processor configured to execute the communication module, the buffering module, the traffic module, the metering module, and the secondary module, module, wherein: the communication module further maintains an additional cloud service connection to the cloud storage service: the traffic module further determines that the additional data will not be received via the client connection within a cloud service connection timeout period for the cloud service connection: the metering module further transmits at least a portion of the data to the cloud storage service using the cloud service connection to the cloud storage service before the cloud service connection timeout period for the cloud service connection has elapsed: the at least one secondary data buffer is smaller in allocated memory size than the allocated memory size of the at least one data buffer: the at least one secondary data buffer amounts to 5-10 percent of total buffer memory.

12. The system of claim 11, wherein the metering module delays reception of additional data from the client connection by delaying notification of the client that the data has been received.

13. The system of claim 11, wherein:
the traffic module determines that no data buffer of the at least one data buffer is available to buffer the data received via the client connection;
the metering module delays reception of additional data from the client connection by:
buffering the data from the client connection in the at least one secondary data buffer;
delaying reception of additional data from the client connection for a portion of the timeout period.

14. The system of claim 11, wherein:
the traffic module determines that the data will be transmitted to the cloud storage service within the timeout period for the client connection;
the metering module delays reception of additional data from the client connection until an acknowledgement has been received that the cloud storage service has received the data.

15. The system of claim 11, wherein: the communication module receives, via a the additional cloud service connection to the cloud storage service, data to be transmitted to the client; the buffering module buffers the data in at least one data buffer; the traffic module determines that the data will not be transmitted to the client within a the cloud service connection timeout period for the cloud service connection; the metering module delays reception of additional data from the cloud service connection for a portion of the cloud service connection timeout period; the secondary buffering module, before the cloud service connection timeout period has elapsed, buffers data from the cloud service connection in at least one secondary data buffer.

16. The system of claim 11, wherein the traffic module determines a number of additional connections to the cloud storage service to maintain based at least in part on a ratio of the timeout period for the cloud service connection to a time to receive, from the client, data to fill the data buffer.

17. The system of claim 11, wherein:
the traffic module:
determines a total bandwidth utilization of a plurality of connections to the cloud storage service;
determines that the total bandwidth utilization is below a threshold;
the metering module incrementally increases a rate at which at least one connection transmits data to the cloud storage service.

18. A non-transitory computer-readable medium comprising one or more computer-readable instructions that, when executed by at least one processor of a computing device, cause the computing device to: receive, via a client connection to a client, data to be transmitted to a cloud storage service as part of a backup process; buffer the data in at least one data buffer; determine that the data will not be transmitted to the cloud storage service within a timeout period for the client connection; delay reception of additional data from the client connection for a portion of the timeout period; before the timeout period has elapsed, buffer data from the client connection in at least one secondary data buffer; maintain an additional cloud service connection to the cloud storage service; determine that the additional data will not be received via the client connection within a cloud service connection timeout period for the cloud service connection; transmit at least a portion of the data to the cloud storage service using the cloud service connection to the cloud storage service before the cloud service connection timeout period for the cloud service connection has elapsed, wherein: the at least one secondary data buffer is smaller in allocated memory size than the allocated memory size of the at least one data buffer; the at least one secondary data buffer amounts to 5-10 percent of total buffer memory.

* * * * *

UNITED STATES PATENT AND TRADEMARK OFFICE
CERTIFICATE OF CORRECTION

PATENT NO. : 9,998,394 B2  
APPLICATION NO. : 14/833590  
DATED : June 12, 2018  
INVENTOR(S) : Agrawal et al.

Page 1 of 1

It is certified that error appears in the above-identified patent and that said Letters Patent is hereby corrected as shown below:

In the Claims

Column 17, Line 26, Claim 5, delete "within a the cloud" and insert -- within the cloud --, therefor.

Column 17, Lines 33-34, Claim 6, delete "of claim 1, claim 1, further" and insert -- of claim 1, further --, therefor.

Column 18, Line 18, Claim 11, delete "secondary module, module, wherein:" and insert -- secondary module, wherein: --, therefor.

Column 18, Line 56, Claim 15, delete "via a the" and insert -- the cloud --, therefor.

Column 18, Line 60, Claim 15, delete "a the cloud" and insert -- the cloud --, therefor.

Signed and Sealed this  
Eleventh Day of September, 2018

Andrei Iancu  
*Director of the United States Patent and Trademark Office*